US007806307B2

(12) United States Patent
Bergerhoff et al.

(10) Patent No.: US 7,806,307 B2
(45) Date of Patent: Oct. 5, 2010

(54) CARRIER DEVICE FOR A BICYCLE

(75) Inventors: Harald Bergerhoff, Hamburg (DE); Michael Waller, Hamburg (DE); Gerald Hahn, Wistedt (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 691 days.

(21) Appl. No.: 11/770,273

(22) Filed: Jun. 28, 2007

(65) Prior Publication Data
US 2008/0006667 A1 Jan. 10, 2008

(30) Foreign Application Priority Data
Jul. 8, 2006 (DE) .................. 10 2006 031 693

(51) Int. Cl.
*B60R 9/10* (2006.01)
(52) U.S. Cl. .................. 224/496; 224/497; 224/508; 224/282; 224/924
(58) Field of Classification Search .......... 224/282, 224/496, 497, 508, 924, 489, 491; 16/319, 16/321, 324; 108/129–133
See application file for complete search history.

(56) References Cited

U.S. PATENT DOCUMENTS

| | | | | |
|---|---|---|---|---|
| 2,471,730 A * | 5/1949 | Doerr | ................ | 108/33 |
| 3,670,935 A * | 6/1972 | Hinkston | ................ | 224/497 |
| 4,702,401 A * | 10/1987 | Graber et al. | ................ | 224/536 |
| 5,025,932 A | 6/1991 | Jay | | |
| 5,303,858 A * | 4/1994 | Price | ................ | 224/405 |
| 5,528,997 A * | 6/1996 | Miller | ................ | 108/131 |
| 5,947,357 A * | 9/1999 | Surkin | ................ | 224/536 |
| 6,626,340 B1 * | 9/2003 | Burgess | ................ | 224/536 |
| 7,121,597 B2 * | 10/2006 | Chuang | ................ | 293/117 |
| 7,240,816 B2 * | 7/2007 | Tsai | ................ | 224/501 |
| 2005/0061842 A1 * | 3/2005 | Tsai | ................ | 224/501 |
| 2007/0102465 A1 * | 5/2007 | Wezyk et al. | ................ | 224/321 |

FOREIGN PATENT DOCUMENTS

| | | |
|---|---|---|
| AT | 348 180 B | 2/1979 |
| DE | 42 13 216 C1 | 6/1993 |
| DE | 94 20 632 U1 | 3/1995 |
| DE | 697 08 988 T | 8/2002 |
| DE | 102 31 963 A1 | 2/2004 |
| DE | 10 2004 007 280 A1 | 9/2005 |
| DE | 10 2004 007 816 A1 | 9/2005 |
| DE | 102004021709 A1 * | 12/2005 |
| DE | 10 2004 038 841 A1 | 2/2006 |
| JP | 2008013172 A * | 1/2008 |

* cited by examiner

*Primary Examiner*—Justin M Larson
(74) *Attorney, Agent, or Firm*—Brooks Kushman P.C.

(57) ABSTRACT

A bicycle carrier for a vehicle includes a holding column and a support device. The holding column is movable between a horizontal position and an upright position. The holding column is operable for receiving a crank arm of a pedal of a bicycle when the holding column is in the upright position. The support device fixes the holding column in the upright position when the holding column is in the upright position.

16 Claims, 4 Drawing Sheets

US 7,806,307 B2

CARRIER DEVICE FOR A BICYCLE

CROSS-REFERENCE TO RELATED APPLICATIONS

This application claims foreign priority benefits under 35 U.S.C. §119(a)-(d) to DE 10 2006 031 693.2, filed Jul. 8, 2006, which is hereby incorporated by reference in its entirety.

BACKGROUND OF THE INVENTION

1. Field of the Invention

The present invention relates to a bicycle carrier for a motor vehicle.

2. Background Art

U.S. Pat. No. 5,025,932 describes a bicycle carrier for a vehicle by which two upright bicycles may be transported side-by-side. The carrier has tracks, each holding the wheels of a respective bicycle, and upright hollow columns. Each column is for receiving a crank arm of a pedal of a bicycle with the crank arm being axially secured by a cap covering the top of the column.

DE 697 08 988 T2 describes a bicycle carrier having a clamp suitable for locking a crank arm of a pedal of a bicycle, regardless of the type of crank arm. The clamp has a support for an axle housing of the crank arm. The support may be tilted via a shaft running transverse to the longitudinal direction of a post. The clamp accepts both straight and right-angled crank arms.

DE 94 20 632 U1 relates to a bicycle carrier for a vehicle in which a support holder holds a crank arm of a pedal of a bicycle. The holder includes a lower fixed support element and an upper cover element adjustable in the transverse direction of the holder which cooperate with the crank arm. The holder has a C-shaped cross-sectional shape, and the adjustable element has a set screw. The support element is not longitudinally movable in the holder.

DE 102 31 963 B4 describes a load carrier having a load support displaceably supported in a vehicle by a track system. A component of the load support is a fixing device by which the load support may be fixed in either a retracted neutral position or an extended operating position.

SUMMARY OF THE INVENTION

An object of the present invention includes a bicycle carrier for use with a vehicle in which the carrier includes a holding column for receiving a crank arm of a pedal of a bicycle in which the holding column is movable between a horizontal stored position and an upright operating position.

Another object of the present invention includes a bicycle carrier for use with a vehicle in which the carrier includes a holding column for receiving a crank arm of a pedal of a bicycle in which the holding column is movable between a horizontal stored position and an upright operating position and is fixable at least in the upright position by a support device.

In carrying out the above objects and other objects, the present invention provides a bicycle carrier for a vehicle. The bicycle carrier includes a holding column and a support device. The holding column is movable between a horizontal position and an upright position. The holding column is operable for receiving a crank arm of a pedal of a bicycle when the holding column is in the upright position. The support device fixes the holding column in the upright position when the holding column is in the upright position.

Also, in carrying out the above objects and other objects, the present invention provides a bicycle carrier for a vehicle. The bicycle carrier includes a frame having a base holder and a support holder. The base holder is mountable to a rear end of a vehicle. The support holder is for holding a pair of bicycles side-by-side transversely to the longitudinal direction of the vehicle. The support holder is movably connected to the base holder to be movable between a neutral position in which the support holder is pushed into a body structure of the rear end of the vehicle and an operating position in which the support holder is extended from the rear end of the vehicle to hold the bicycles. The bicycle carrier further includes a pair of holding columns movably connected to the support holder such that each holding column is independently movable between a horizontal position within the frame and an upright position extended above the frame. Each holding column is operable to receive and hold a crank arm of a pedal of a bicycle when the holding column is in the upright position. The bicycle carrier further includes a support device extending between the support holder and each holding column for fixing each holding column in the upright position when the holding column is in the upright position.

Primary advantages of a bicycle carrier in accordance with an embodiment of the present invention include each holding column of the bicycle support holder of the carrier being movable between a horizontal stored position and an upright operating position. In the horizontal position, each holding column may be positioned in a spatially favorable manner in the carrier as well as in the vehicle. In the upright position, each holding column may receive and hold a crank arm of a pedal of a respective bicycle. The support holder is movable between a neutral position in which the support holder is pushed into a body structure of the vehicle to an operating position in which the support holder is extended from the body structure of the vehicle to receive bicycles.

Each of the holding columns is independently movable between the horizontal position and the upright position. A swivel bearing on a frame of the carrier enables a holding column to move between the horizontal position and the upright position. A support device installed between the frame and a holding column fixes the holding column in its upright position. The guide rod system formed by two guide rods is suited as the support device. The proper function thereof being achieved by the fact that the guide rod system assumes an extended dead center position in the upright position of the holding column. This dead center position is ensured by a locking system attached to the holding column. The locking system has an optimal ease of use.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
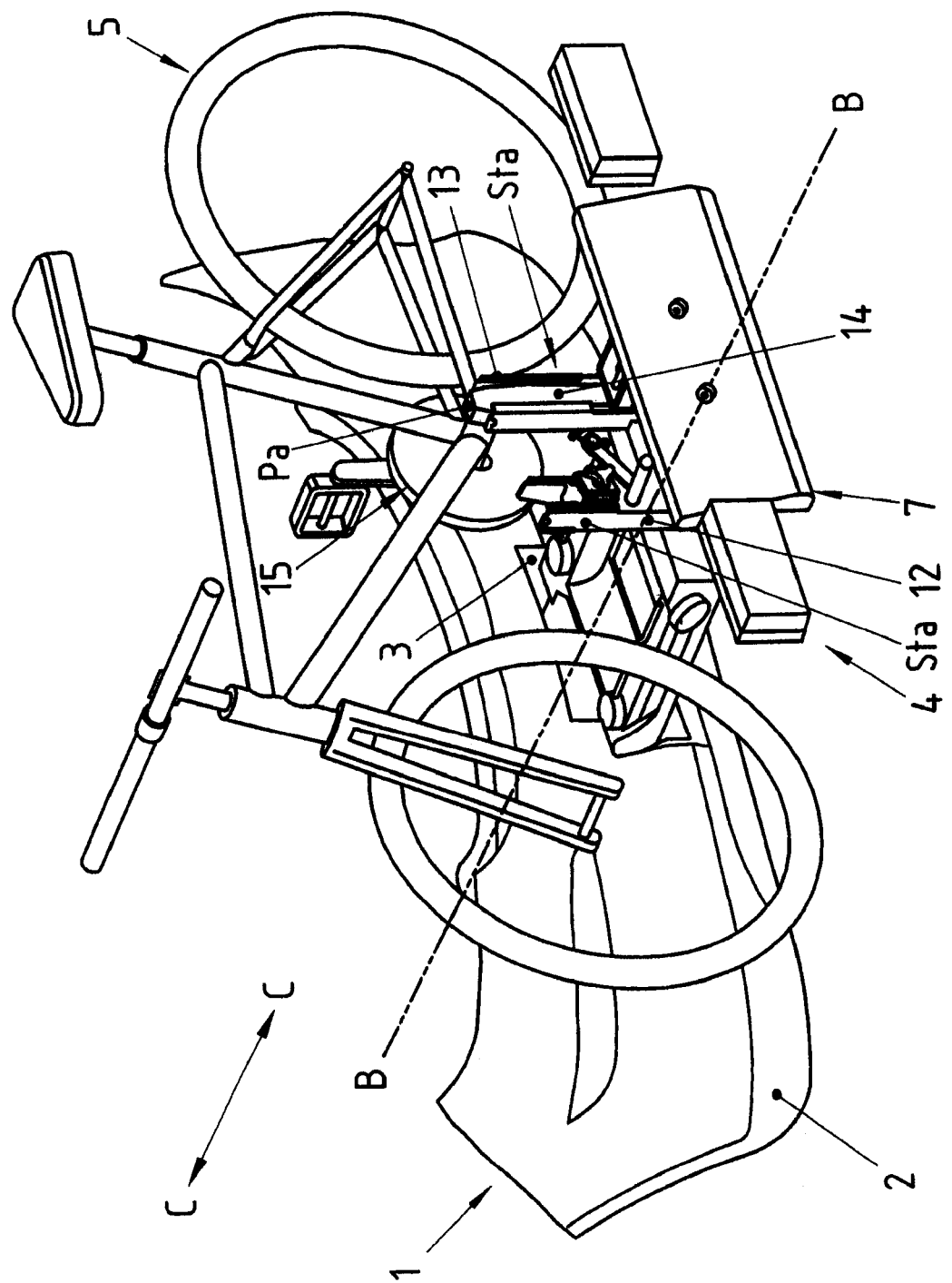
FIG. 1 illustrates a perspective view of a rear portion of a vehicle having a bicycle carrier in accordance with an embodiment of the present invention.

Identical or similar components have the same reference numerals in the figures.

Referring now to FIG. 1, a perspective view of a rear portion 2 of a passenger vehicle 1 having a bicycle carrier 4 in accordance with an embodiment of the present invention. Rear portion 2 of vehicle 1 has an opening 3 running along a central longitudinal plane B-B for receiving an extension of carrier 4 in order for carrier 4 to be mounted to vehicle 1. Carrier 4 is intended for use with vehicle 1 to transport two upright bicycles side-by-side.

Figure 2:
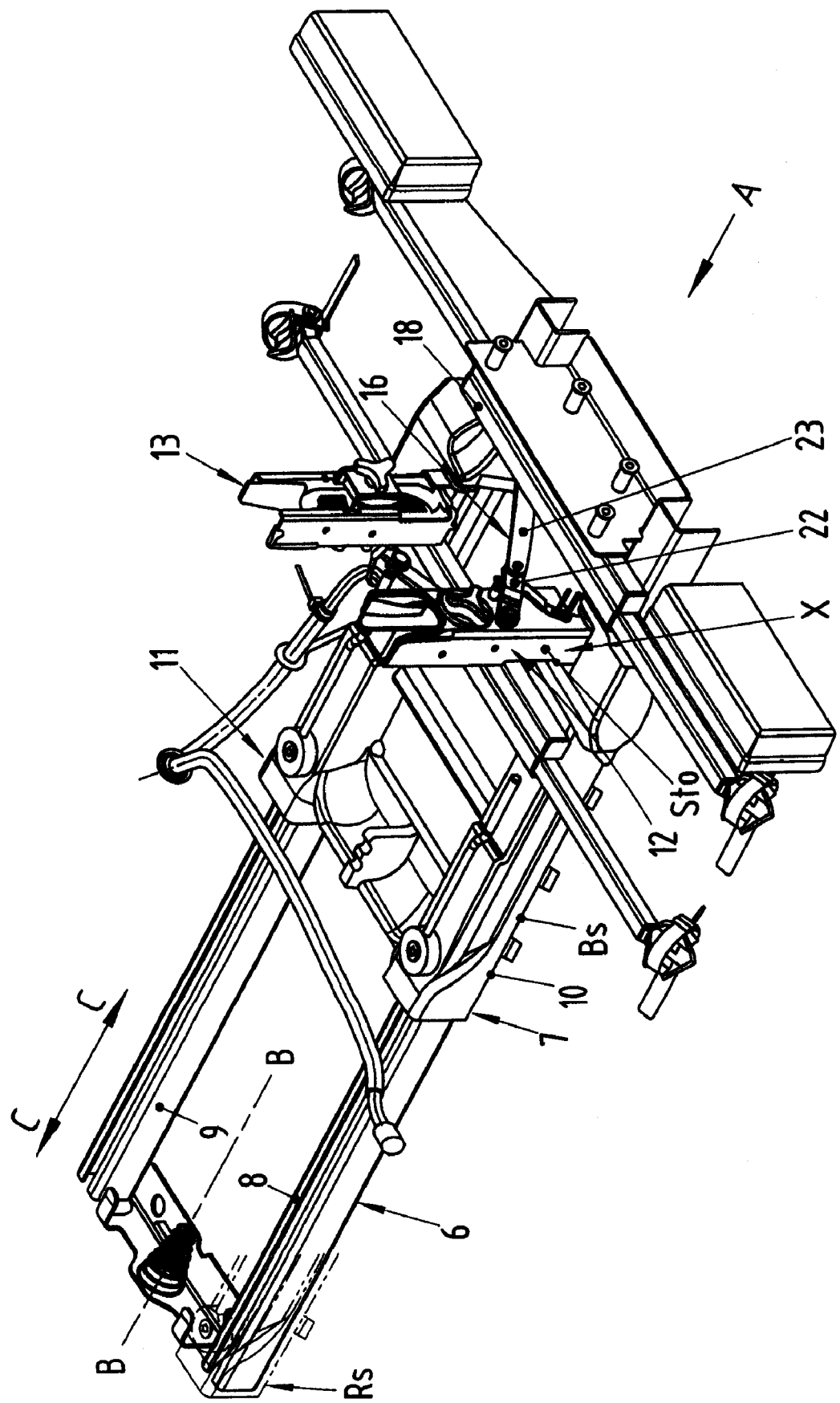
FIG. 2 illustrates a perspective view of the bicycle carrier.

Referring now to FIG. 2, with continual reference to FIG. 1, a perspective view of carrier 4 is shown. Carrier 4 includes a base holder 6 and a support holder 7. Bicycles aligned transversely to longitudinal direction C-C of vehicle 1 mount onto support holder 7. FIG. 1 illustrates a bicycle 5 mounted onto support holder 7 in this manner. Support holder 7 is movable relative to base holder 6 between a neutral position Rs and an operating position Bs. For this purpose, base holder 6 includes inner guide rails 8, 9 on respective sides of central longitudinal plane B-B and support holder 7 includes outer guide rails 10, 11 on respective sides of central longitudinal plane B-B. Inner guide rails 8, 9 cooperate with corresponding outer guide rails 10, 11 to enable support holder 7 to be movable relative to base holder 6.

Support holder 7 includes two functionally identical hollow body holding columns 12, 13. Each holding column 12, 13 is independently and separately movable between a horizontal stored position Stl (see FIG. 3) and an upright operating position Sta. Each holding column 12, 13 is operable to receive and hold a crank arm of a pedal of a respective bicycle when the holding column is in the upright position Sta. FIG. 1 illustrates holding column 13 receiving and holding a crank arm 14 of a pedal Pa of bicycle 5 when holding column 13 is in the upright position Sta. Holding column 13 receives crank arm 14 of bicycle 5 as crank arm 14 is inserted from above and downward into holding column 13.

Figure 3:
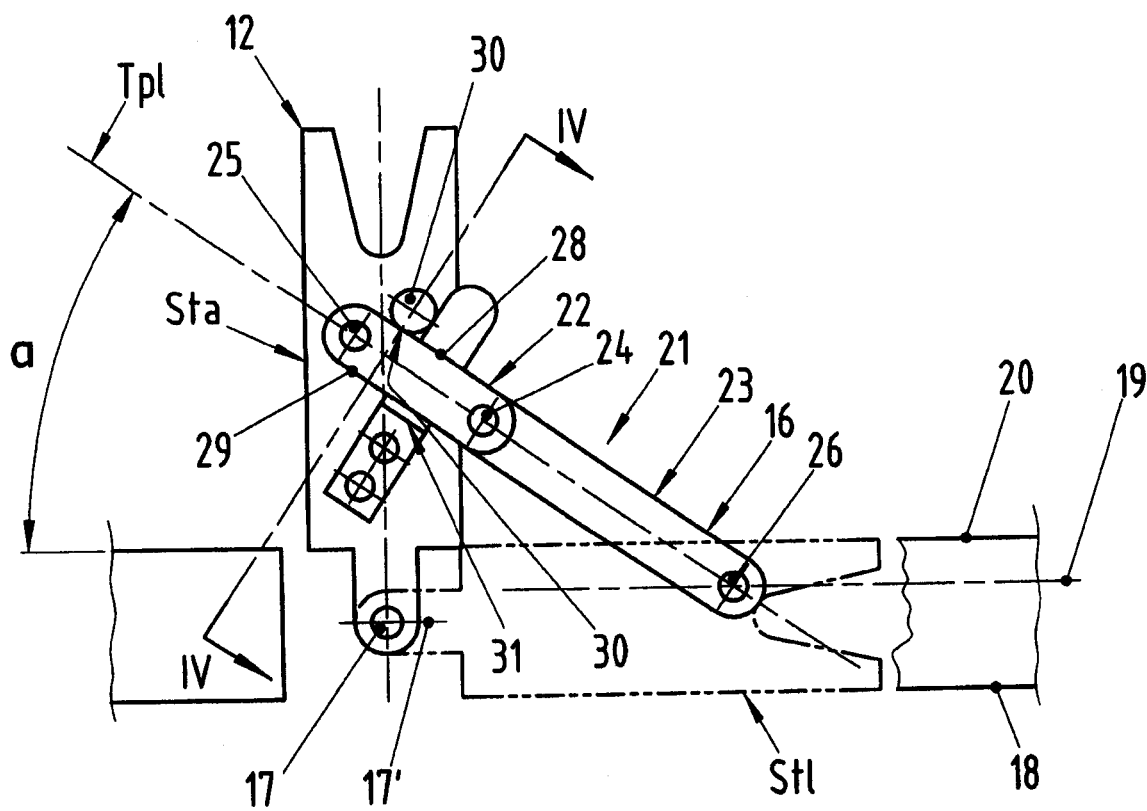
FIG. 3 illustrates a schematic view of a holding column of the bicycle carrier viewed in the direction of arrow A of FIG. 2.

Referring now to FIG. 3, with continual reference to FIGS. 1 and 2, a schematic view of holding column 12 viewed in the direction of arrow A of FIG. 2 is shown. No bicycle crank arm is received in holding column 12. As such, holding column 12 may be moved between the horizontal position Stl and the upright position Sta. In the upright position Sta, holding column 12 is fixed in place by a releasable support device 16. A swivel bearing 17 on a frame 18 of carrier 4 moves holding column 12 between the horizontal position Stl and the upright position Sta. Swivel bearing 17 has a swivel axis 17' running in longitudinal vehicle direction C-C. Swivel bearing 17 is in frame 18 of carrier 4 such that holding column 12 is largely countersunk within frame 18 when holding column 12 is in the horizontal position Sta.

Support device 16 acts between holding column 12 and frame 18. Support device 16 runs in the manner of a diagonal brace at an acute angle α with respect to a horizontal 19 aligned in parallel with an upper border 20 of frame 18. Support device 16 is formed by a guide rod system 21. Guide rod system 21 includes a first guide rod 22 and a second guide rod 23. Guide rods 22, 23 are connected to one another at their mutually facing ends via a first articulated joint 24. First guide rod 22 is connected to holding column 12 via a second articulated joint 25. Second guide rod 23 is connected to frame 18 via a third articulated joint 26. Guide rods 22, 23 have different lengths. The length of first guide rod 22 is less than the length of second guide rod 23.

Figure 4:
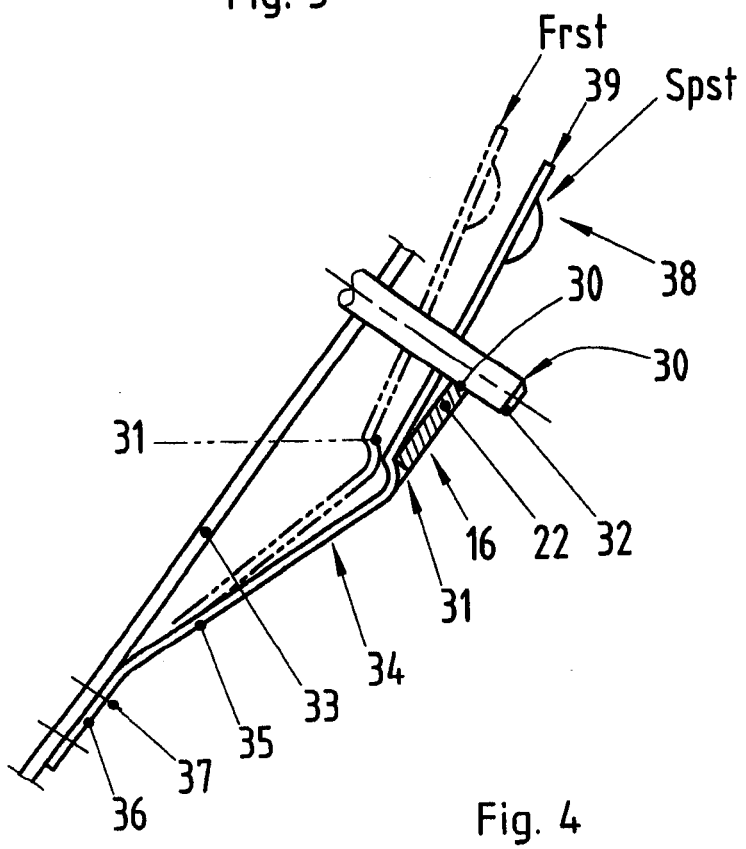
FIG. 4 illustrates an enlarged sectional view along line IV-IV of FIG. 3.
Figure 5:
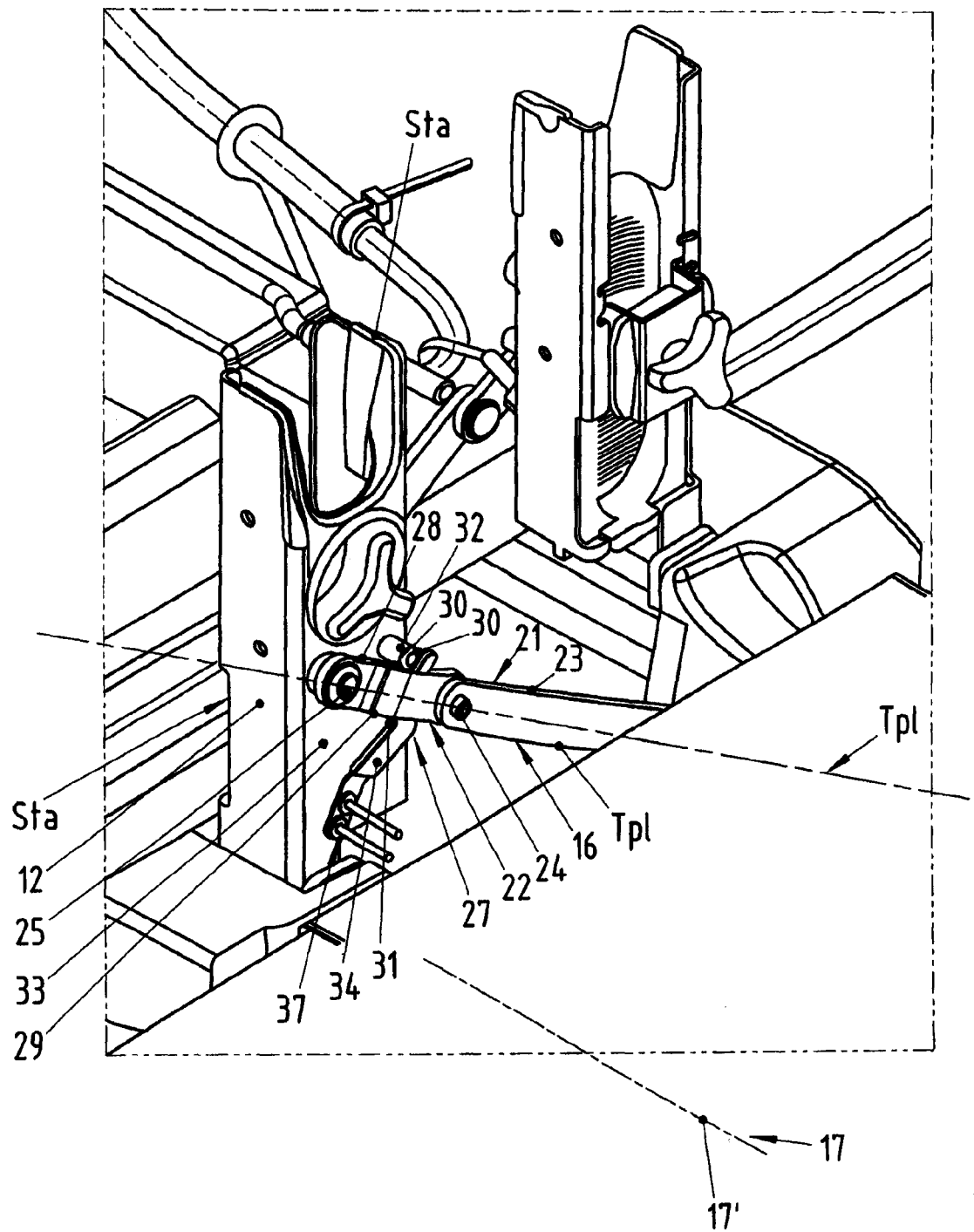
FIG. 5 illustrates an enlarged view of detail X of FIG. 2.

Referring now to FIGS. 4 and 5, with continual reference to FIGS. 1, 2, and 3, an enlarged sectional view along line IV-IV of FIG. 2 and an enlarged view of detail X of FIG. 2 are respectively shown. In the upright position Sta of holding column 12, guide rods 22, 23 assume an extended top dead center position Tpl. A locking system 27 engages with first guide rod 22, for example, for guide rods 22, 23 when guide rods 22, 23 are in the extended top dead center position. Locking system 27 acts at opposite longitudinal sides 28, 29 of first guide rod 22.

Locking system 27 is formed by a first stop 30 and a second stop 31. First stop 30 is formed by a pin 32 which is held in place at a wall 33 of holding column 12. Second stop 31 may be manually moved from a locked position Spst to a released position Frst. Second stop 31 includes a leaf spring-like actuating element 34 having a spring section 35 and a bearing section 36. Holding means 37 fasten bearing section 36 to wall 33 of holding column 12. A hand lever 39 is integrally molded onto one free side 38 of actuating element 34.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A bicycle carrier for a vehicle, the carrier comprising:
a frame;
a holding column movable between a horizontal position and an upright position relative to the frame, the holding column operable for receiving a crank arm of a pedal of a bicycle when the holding column is in the upright position;
a guide rod system for fixing the holding column in the upright position when the holding column is in the upright position, the guide rod system having first and second guide rods connected to one another via a first articulated joint, wherein the first guide rod is supported on the holding column via a second articulated joint and the second guide rod is supported on the frame via a third articulated joint, wherein when the holding column is in the upright position the guide rods extend at an angle between the frame and the holding column and assume an extended top dead center position; and
a locking system having a pin and an actuating element respectively engageable with opposite first and second sides of the first guide rod when the guide rods are in the extended top dead center position for locking the guide rods in the extended top dead center position;
wherein the pin is fixedly connected directly to the holding column adjacent the second articulated joint and projects from the holding column such that the pin engages the first side of the first guide rod when the guide rods are in the extended top dead center position;
wherein the actuating element includes a bearer section and a spring section, wherein the bearer section is fixedly connected to the holding column, wherein the spring section extends from the bearer section between the holding column and the first guide rod and is movable relative to the bearer section between a locked position in which the spring section engages the second side of the guide rod when the guide rods are in the extended top dead center position and an unlocked position in which the spring section disengages from the first guide rod.

2. The carrier of claim 1 further comprising:
a swivel bearing connected between the frame and the holding column for enabling the holding column to be movable between the horizontal position and the upright position.

3. The carrier of claim 2 wherein:
a rotational axis of the swivel bearing is aligned in a longitudinal vehicle direction.

4. The carrier of claim 1 wherein:
the holding column is countersunk within the frame when the holding column is in the horizontal position.

5. The carrier of claim 1 wherein:
the spring section of the actuating element is biased to the locked position.

6. The carrier of claim 1 wherein:
the spring section of the actuating element includes a hand lever which can be used to move the spring section between the locked and unlocked positions.

7. The carrier of claim 1 wherein:
the guide rods have different lengths.

8. The carrier of claim 7 wherein:
the length of the first guide rod is less than the length of the second guide rod.

9. A bicycle carrier for a vehicle, the carrier comprising:
a frame having a base holder and a support holder, the base holder being mountable to a rear end of a vehicle, the support holder for holding a pair of bicycles side-by-side transversely to the longitudinal direction of the vehicle;
wherein the support holder is movably connected to the base holder to be movable between a neutral position in which the support holder is pushed into a body structure of the rear end of the vehicle and an operating position in which the support holder is extended from the rear end of the vehicle to hold the bicycles;
a pair of holding columns movably connected to the support holder such that each holding column is independently movable between a horizontal position within the frame and an upright position extended above the frame, wherein each holding column is operable to receive and hold a crank arm of a pedal of a bicycle when the holding column is in the upright position;
pair of guide rod systems, respectively associated with the holding columns, for respectively fixing the holding columns in the upright position when the holding columns are in the upright position;
wherein each guide rod system has first and second guide rods connected to one another via a first articulated joint, wherein the first guide rod is supported on the associated holding column via a second articulated joint and the second guide rod is supported on the frame via a third articulated joint, wherein when the associated holding column is in the upright position the guide rods extend at an angle between the frame and the associated holding column and assume an extended top dead center position; and
a pair of locking systems respectively associated with the guide rod systems and the associated holding columns, each locking system having a pin and an actuating element respectively engageable with opposite first and second sides of the first guide rod of the associated guide rod system when the guide rods of the associated guide rod system are in the extended top dead center position for locking the guide rods of the associated guide rod system in the extended top dead center position;
wherein the pin is fixedly connected directly to the associated holding column adjacent the second articulated joint and projects from the associated holding column such that the pin engages the first side of the first guide rod of the associated guide rod system when the guide rods of the associated guide rod system are in the extended top dead center position;
wherein the actuating element includes a bearer section and a spring section, wherein the bearer section is fixedly connected to the associated holding column, wherein the spring section extends from the bearer section between the associated holding column and the first guide rod of the associated guide rod system and is movable relative to the bearer section between a locked position in which the spring section engages the second side of the guide rod of the associated guide rod system when the guide rods of the associated guide rod system are in the extended top dead center position and an unlocked position in which the spring section disengages from the first guide rod of the associated guide rod system.

10. The carrier of claim 9 further comprising:
a swivel bearing connected between the support holder and each holding column for enabling the holding column to be movable between the horizontal position and the upright position.

11. The carrier of claim 9 wherein:
the length of the first guide rod is less than the length of the second guide rod for each guide rod system.

12. A bicycle carrier for a vehicle, the carrier comprising:
a frame having a base holder and a support holder, the base holder being mountable to a rear end of a vehicle, the support holder for holding a bicycle transversely to the longitudinal direction of the vehicle;
wherein the support holder is movably connected to the base holder to be movable between a neutral position in which the support holder is pushed into a body structure of the rear end of the vehicle and an operating position in which the support holder is extended from the rear end of the vehicle to hold the bicycle;
a holding column movably connected to the support holder such that the holding column is movable between a horizontal position within the support holder and an upright position extended above the support holder, wherein the holding column is operable to receive and hold a crank arm of a pedal of the bicycle when the holding column is in the upright position;
a guide rod system for fixing the holding column in the upright position when the holding column is in the upright position, wherein the guide rod system has first and second guide rods connected to one another via a first articulated joint, wherein the first guide rod is supported on the holding column via a second articulated joint and the second guide rod is supported on the support holder via a third articulated joint, wherein when the holding column is in the upright position the guide rods extend at an angle between the support holder and the holding column and assume an extended top dead center position; and
a locking system having a pin and an actuating element respectively engageable with opposite first and second sides of the first guide rod when the guide rods are in the extended top dead center position for locking the guide rods in the extended top dead center position;
wherein the pin is fixedly connected directly to the holding column adjacent the second articulated joint and projects from the holding column such that the pin engages the first side of the first guide rod when the guide rods are in the extended top dead center position;
wherein the actuating element includes a bearer section and a spring section, wherein the bearer section is fixedly connected to the holding column, wherein the spring section extends from the bearer section between the holding column and the first guide rod and is movable relative to the bearer section between a locked position in which the spring section engages the second side of the guide rod when the guide rods are in the extended top dead center position and an unlocked position in which the spring section disengages from the first guide rod.

13. The carrier of claim 12 wherein:
the spring section of the actuating element is biased to the locked position.

14. The carrier of claim 12 wherein:
the spring section of the actuating element includes a hand lever which can be used to move the spring section between the locked and unlocked positions.

15. The carrier of claim 12 wherein:
the guide rods have different lengths.

16. The carrier of claim 15 wherein:
the length of the first guide rod is less than the length of the second guide rod.

* * * * *